Patented Sept. 13, 1932

1,876,909

UNITED STATES PATENT OFFICE

ROYAL W. GELDER, OF GREELEY, COLORADO

METHOD OF MAKING MAGNESIAN CEMENT

No Drawing.   Application filed July 26, 1927.   Serial No. 208,660.

This invention relates to a process of making a cement comprised chiefly of magnesium compounds and has for its principal object a general improvement in the method of making a magnesian cement.

A particular object of the present invention is to provide an improved magnesian cement which does not require the use of magnesite for its manufacture.

It is known that when magnesite, the pure carbonate of magnesium, is calcined at a low heat, and the resultant magnesia is powdered and mixed with a solution of magnesium chloride, a strong and hard composition results which is commonly called "Sorel cement".

In this composition, however, part of the magnesium chloride does not combine with the magnesia, and owing to its deliquescent nature it attracts and absorbs moisture from the air, causing dampness and unsightly efflorescence, and eventually an impairment of the soundness of the composition, since the uncombined magnesium chloride, when in liquid form, acts as a solvent of the composition.

Furthermore, in making Sorel cement, it has been necessary to use only the pure grades of magnesite, owing to the detrimental effect of even small quantities of calcium lime upon this composition, and since pure magnesite is of rare occurrence and is accordingly costly and difficult to procure, the uses of compositions made therefrom are more or less restricted.

In my present process I overcome these faults by producing sufficient magnesia for the initial reaction with magnesium chloride, and thereafter by reacting magnesium sulphite with calcium hydrate I produce additional magnesia to react with excess magnesium chloride, and at the same time I convert the lime hydrate, which otherwise would constitute a detriment to the cement, into a selenitized lime with independent hydraulic properties, which acts as a component of my cement and tends to increase the wet strength thereof.

The following description sets forth in detail one approved method of carrying out the invention, such disclosed method, however, constituting but one of the various ways in which the principle of the invention may be used.

In accordance with the present invention it is not required to use magnesite. On the contrary, I prefer to use the common and abundant dolomites or magnesian limestones.

Such magnesian limestone is accordingly first broken and crushed to such size as will pass through an opening of say, one inch in diameter.

The material, thus crushed, is fed into a kiln and calcined at a temperature of from 900° C. to 1100° C. for a period of from thirty minutes to one hour.

The duration of the heating period is naturally dependent, to a degree, upon the composition of the limestone with respect to its magnesium carbonate content, and also, upon the structure of the stone. I find, however, that a marked uniformity of result is obtained, even without allowing for variations in composition or structure.

While a heating interval of forty minutes is therefore usually employed, I do not wish to be restricted to any definite period.

The material from the calcination step, consisting of caustic magnesia, together with calcium lime and some undissociated calcium carbonate, is then discharged from the kiln and is hydrated in the usual manner and reduced to a more or less pulverized form.

The hydrated product is then subjected to the action of commingled gases of carbon dioxide and sulphur dioxide at a temperature of from 300° C. to 700° C., at which temperature I find that carbon dioxide does not re-associate with the magnesia but by reason of its affinity for the calcium lime it causes the sulphur dioxide to be selectively absorbed by the magnesia to form magnesium sulphite. At the same time the temperature is not sufficient to drive off the water of hydration from the calcium lime.

The treatment with the gases would be continued, theoretically, until the residual calcium lime in the product was balanced molecularly by the magnesium sulphite formed. In practice, however, it is not necessary to obtain this exact relation, since the magnesium sulphite is considerably more soluble in water than the calcium hydrate, and the proportion of magnesium sulphite formed may be relatively less than the residual calcium hydrate.

The treatment with sulphur dioxide and carbon dioxide gases, in practice, is therefore usually governed by time, a period being allowed which produces satisfactory results by test, and ordinarily of substantially the same duration as the calcination period. Sulphur dioxide for the foregoing step may be obtained by burning sulphur or pyrite, or as I have found, by using a coal high in sulphur for the calcination step, whereby some of the desired magnesium sulphite is formed during the calcination, and the remainder from gases recovered from the calcination step.

The material is then cooled and pulverized or separated by air, depending on the degree of pulverization affected by the hydration step.

The pulverized product, thus prepared, then contains, some magnesia, some magnesium sulphite, and some calcium hydrate.

When magnesium chloride solution at say 20° Bé. is added to the pulverized product, prepared as above described, a reaction immediately takes place between the magnesia and a portion of the magnesium chloride as in the case with a calcined magnesite. In addition, but more slowly, a reaction takes place between the magnesium sulphite and the calcium hydrate, by which reaction is formed a chemical magnesia which reacts as quickly as formed with excess magnesium chloride, while on the other hand the calcium hydrate becomes selenitized by the sulphite radicle and thereby developes hydraulic properties and a considerable cementing value. Since these reactions recur over a considerable period with recurrent wetting or exposure to weather, the strength and weather-proof qualities of the cement improve with age.

It is known that the mineral, magnesite, seldom occurs as the pure carbonate of magnesium but that it usually contains impurities which affect its suitability for use in oxychloride cements. Of these impurities calcium carbonate usually predominates and constitutes so serious an objection that magnesites containing more than 2.6% of calcium carbonate have been considered unfit for these cements. The occurrence of calcium carbonate with magnesite is that of a double carbonate of calcium and magnesium which may be expressed as:

$$MgCO_3 + MgCO_3 : CaCO_3$$

or an intermixture of pure magnesite and dolomite and the magnesite cannot be dissociated without dissociating the dolomite.

The result is that when such magnesites are calcined the calcium carbonate contained is converted into calcium lime, and as such, reacts with magnesium chloride in the making of an oxychloride cement and forms calcium chloride, thus:

$$MgCl_2 + CaO + H_2O = CaCl_2 + Mg(OH)_2$$

which is detrimental to the oxychloride cement in several respects.

It will be understood that socalled magnesites containing dolomite as an impurity, while less common and abundant than ordinary dolomite or magnesian limestone, are equally susceptible of treatment by my specific process and can thereby be made available for use in oxychloride cements.

Attention is called to the fact that the constituents of my cement will operate to prevent any injury by calcium chloride by reacting with any such calcium chloride formed as an intermediary step in the ultimate reactions sought, as shown in the following equations:

$$MgCl_2 + CaO + H_2O = CaCl_2 + Mg(OH)_2$$
$$CaCl_2 + MgSO_3 = CaSO_3 + MgCl_2.$$

I desire to call attention to the fact that the sequence of certain of the above described steps may be altered advantageously under certain conditions without departing from the scope and principle of this invention. For example, in the case where the calcination is conducted in an atmosphere of sulphur dioxide, as in the case where a fuel containing sulphur is used, it is desirable to effect the hydration step after the treatment with sulphur dioxide and carbon dioxide, to avoid a premature reaction between the calcium lime and the magnesium sulphite. The hydration in this case may be effected by means of steam, or by the water of the magnesium chloride solution.

While I have described in detail one method of manufacturing my cement, it will be obvious that the same, or an equivalent, product, may readily be produced by mixing the various ingredients, which I produce in my specific process, or by mixing one or more of the various ingredients with compounds containing the others, without departing from the scope of this invention.

Particular attention is called to the fact that a wide variation in the percentages of the various ingredients of my cement is practicable, and, indeed is frequently desirable, in the production of cements of different characteristics or for different purposes. For example, the setting time, hardness, workability, brittleness, and other characteristics may be changed at will by varying the percentages of the constituents, and I do not use the same proportions for exterior stucco work as for interior plaster work. I do not, therefore, wish to be restricted to definite proportions of the various ingredients.

While I prefer to manufacture my cement as above described, and by so doing can make it more cheaply than by using magnesite, or mechanical mixtures of magnesia, magnesium sulphite, magnesium chloride, and calcium hydrate, I do not wish to be restricted to my fully described method, but I claim broadly, the combination of magnesia, magnesium sulphite, magnesium chloride, and calcium hydrate, to form a cement.

What I claim is:

1. The step in a process of preparing a calcined dolomite for use in a magnesian cement which consists in subjecting the same to the action of sulphur dioxide and carbon dioxide gases at a temperature greater than 300° C.

2. The process of making a magnesian cement which comprises calcining dolomite at a temperature in excess of 815° C., hydrating the calcined product, subjecting the hydrated product to the action of sulphur dioxide and carbon dioxide at a temperature between 300° C., and 700° C., and pulverizing the product.

3. In a process for making a magnesian cement, the simultaneous treatment of a calcined magnesian limestone with carbon dioxide and sulphur dioxide at a temperature between 300° C. and 700° C., whereby sulphur dioxide is caused to be selectively absorbed by any magnesia present, and molecular balance obtained between magnesium sulphite formed, and residual calcium lime.

4. The process of preparing a magnesian limestone for use in a magnesian cement which comprises, crushing such limestone to fragments of about one inch, calcining the crushed material at a temperature in excess of 815° C., pulverizing the calcined product, and subjecting the pulverized product to the action of sulphur dioxide and carbon dioxide gases at a temperature in excess of 300° C.

5. The process of preparing dolomite for use in an oxychloride cement which comprises; crushing such dolomite to small fragments, calcining the same at a temperature in excess of 815° C., hydrating the calcined product, pulverizing the hydrated product, and subjecting the pulverized product to the action of sulphur dioxide and carbon dioxide gases at a temperature between 300° C. and 700° C.

6. The process of preparing a magnesian limestone for use in a magnesian cement which comprises, crushing such limestone to small fragments, calcining the same in an atmosphere of sulphur dioxide and carbon dioxide, pulverizing the calcined product and subjecting the same to gases from the calcination step at a temperature relatively lower than the calcination temperaure.

ROYAL W. GELDER.